T. H. LAURY.
SAW SHARPENING MACHINE.
APPLICATION FILED JUNE 30, 1914.
1,157,558.
Patented Oct. 19, 1915.
3 SHEETS—SHEET 1.
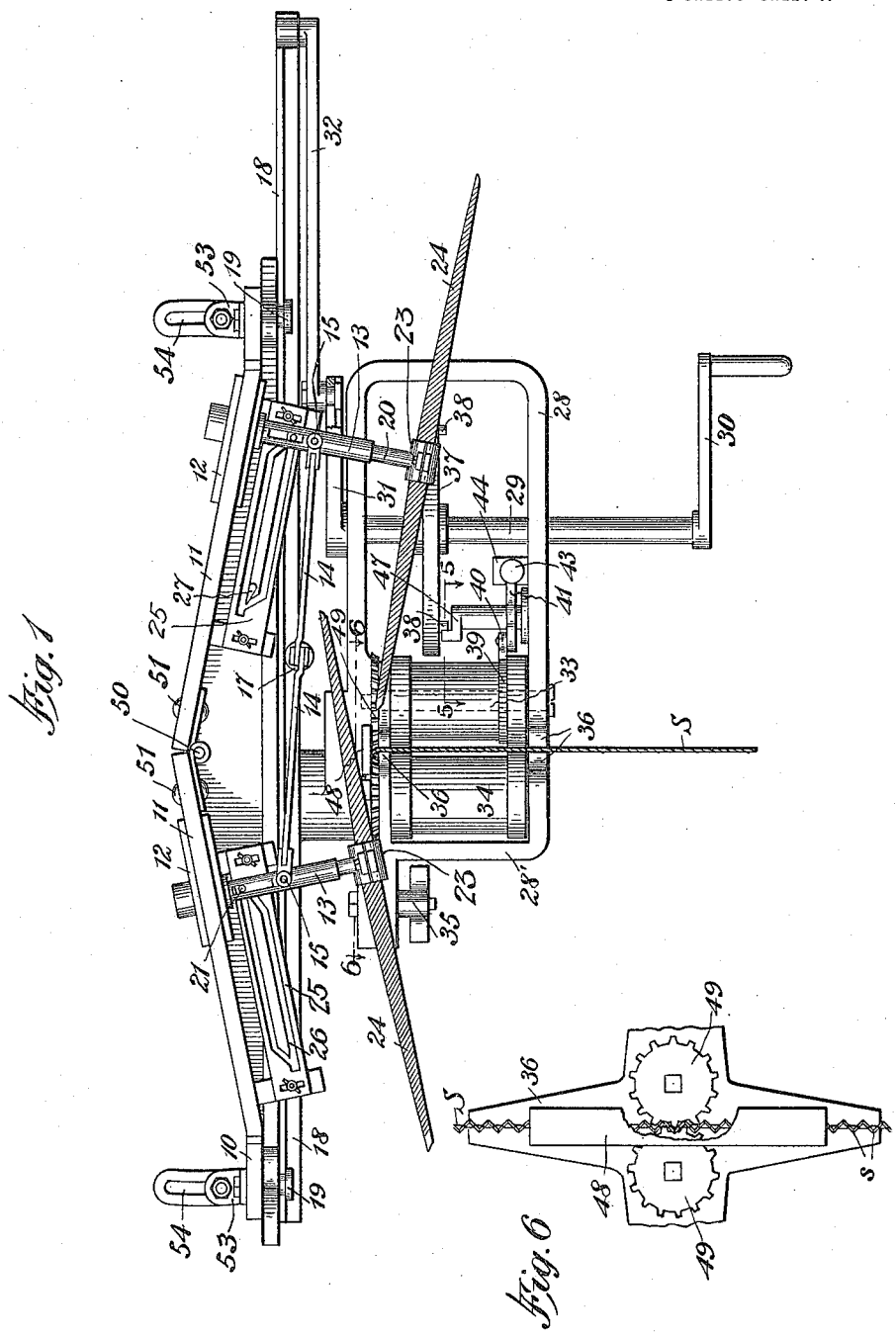
WITNESSES
INVENTOR
Titus H. Laury
BY
ATTORNEYS

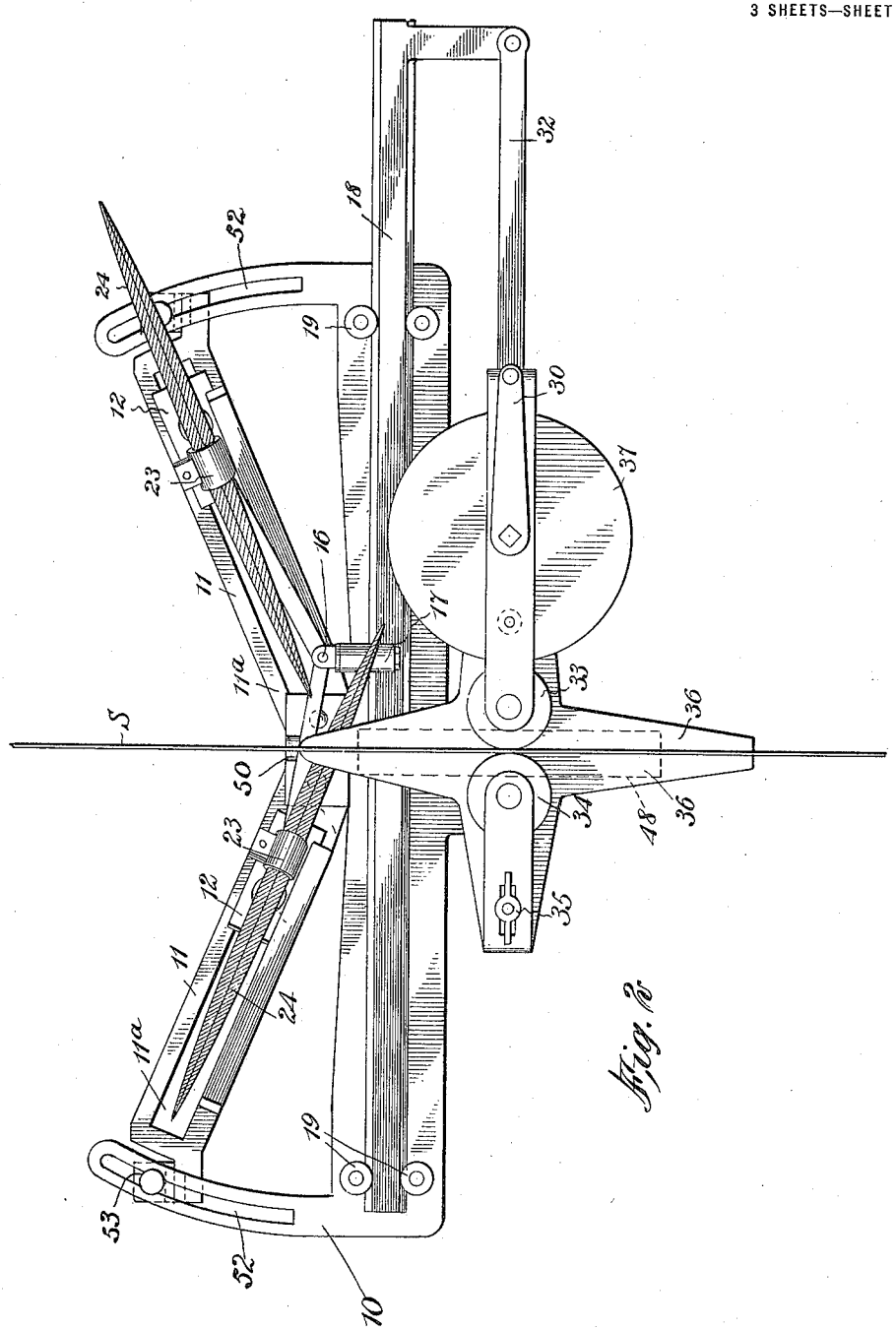

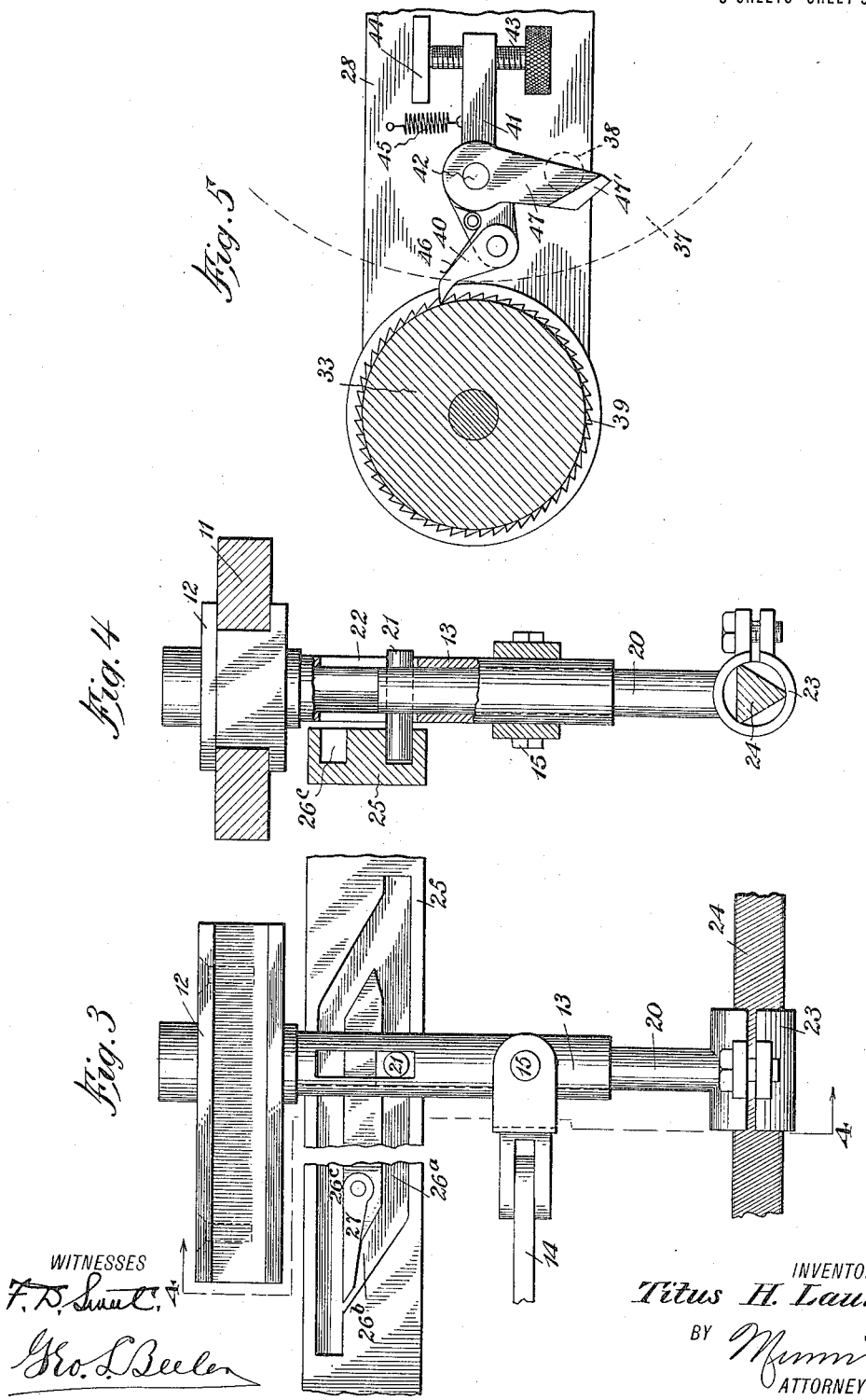

UNITED STATES PATENT OFFICE.

TITUS H. LAURY, OF RED BANK, NEW JERSEY.

SAW-SHARPENING MACHINE.

1,157,558. Specification of Letters Patent. Patented Oct. 19, 1915.

Application filed June 30, 1914. Serial No. 848,182.

*To all whom it may concern:*

Be it known that I, TITUS HOWARD LAURY, a citizen of the United States, and a resident of Red Bank, in the county of Monmouth and State of New Jersey, have invented a new and Improved Saw-Sharpening Machine, of which the following is a full, clear, and exact description.

This invention relates to saw sharpening machines, and has particular reference to devices adapted for automatic rapid operation for the sharpening of various types and sizes of saws.

Among the objects of the invention is to provide a means for holding and feeding a saw along the machine by means of power applied thereto in any suitable manner, and while the saw is being held and fed it is not only sharpened tooth by tooth, but is set and gummed.

A further object of the invention is to provide file holding chucks with means for reciprocating said chucks to actuate the files in alternation, said chucks being adapted for adjustment of the files in accordance with the various types of saw teeth.

The foregoing and many other objects of the invention will hereinafter be more fully described and claimed and illustrated in the drawings forming a part of this specification in which like characters of reference indicate corresponding parts in all the views, and in which—

Figure 1 is a side elevation of a preferred embodiment of the invention; Fig. 2 is a bottom plan view of the same; Fig. 3 is a detached detail taken from the central part of the right hand end of Fig. 1; Fig. 4 is a vertical section on the line 4—4 of Fig. 3; Fig. 5 is an enlarged detail on the line 5—5 of Fig. 1; and Fig. 6 is a detail view on the line 6—6 of Fig. 1.

The several parts of the device may be made of any suitable materials, and the relative sizes and proportions, as well as the general design of the mechanism, may be varied to a considerable extent without departing from the spirit of the invention hereinafter more fully set forth and specifically claimed.

Referring more particularly to the drawings I show at 10 any suitable form of rigid framework having upwardly converging guideways 11, said guideways being adjusted to the horizontal at an angle corresponding to the inclination of the file when operating upon the saw teeth. Said guideways 11 are each straight and provide for the reciprocation of slides 12 to and fro in the slots $11^a$ by suitable mechanism. In each of the slides is secured a sleeve or hollow stem 13 extending at right angles to the plane of the guideway and below the same. A pair of links 14 are connected at their outer ends pivotally at 15 to the sleeves 13 and at their inner ends are connected to the same pivot 16 upon a stud 17 carried by a slidable frame or bar 18 guided along the bottom of the frame 10 between pairs of antifriction rollers 19. Each of the sleeves 13 carries a plunger 20 which is slidable longitudinally therein and provided at its upper end with a guide pin 21 projecting laterally from the plunger through slots 22 in the sleeve. These slots provide for longitudinal movement of the plungers, but, by coöperation with the pin, prevent the rotation of the plunger in the sleeve. To the lower end of the plunger is connected any suitable form of clamp 23 for holding a file 24 in any desired position of adjustment with respect to the axis of the file, depending upon the character of saw teeth to be operated upon. One end of the pin 21 extends rearwardly into a cam block 25 provided with a double cam groove 26. When the file is making its active stroke, the sleeve is operated inwardly or upwardly toward the center of the machine with the pin 21 moving along the lower portion $26^a$ of said groove. As the file approaches the end of its stroke, the pin 21 is guided upwardly along a deflected portion $26^b$ of the groove where it passes a gate 27, and when the file makes its return stroke the file is guided rearwardly over the other portion $26^c$ of the groove. Since the files are operated in alternation, while one file is making its active stroke, the other is returning idly and in a plane above the active file so that there is no interference between the two files.

Below the main frame 10 is secured a rigid yoke 28 constituting a bearing support for a power shaft 29 adapted to be operated in any suitable manner as, for example, by means of a crank 30. Said power shaft 29 is provided at its upper end with a crank 31 having a pitman 32 connecting it with said bar 18. For each complete rotation of the shaft 29, therefore, the bar is given a complete to and fro reciprocation with a corresponding movement of the files.

The numeral 33 represents a feed roller on one side of the saw S, and a companion roller 34 on the opposite side of the saw is journaled in a yoke section 28' adjustable toward and from the main yoke 28 and adapted to be locked in adjusted position by means of a winged nut 35 or the like. The adjacent portions of the yoke members 28 and 28' constitute guiding jaws 36 opposite both ends of the guide rollers 33 and 34 for the purpose of holding the saw in steady position while being acted upon by the machine.

At 37 I show a wheel secured to the power shaft within the yoke 28 and having a pair of lugs 38 secured on one face thereof at the same distance from the axis of the shaft. The guide roller 33 is provided with a ratchet wheel 39 with which coöperates a pawl 40 pivoted upon one end of a bell crank 41 and movable around a fixed shaft or pintle 42 extending upwardly from the lower portion of the yoke 28. The end of the bell crank opposite the pawl is provided with an adjustment screw 43 bearing loosely against a stud 44 extending upwardly from the yoke bottom. The adjustment of the screw 43 provides for a variation in the throw of the bell crank and stroke of the pawl 40. A suitably arranged spring 45 tends to hold the screw abutting against the stop 44 and a spring 46 acts upon the pawl 40 holding it in engagement with the ratchet wheel 39. An arm 47 projects outwardly from the axis of the pintle 42 and has a cam lip 47' extending upwardly into the path of the lugs 38 whereby, when either lug 38 engages the lip 47', the pawl will cause a rotation of the roller 33 according to the length of stroke provided for by adjustment of the screw 43. The teeth of the ratchet wheel are understood to be small and fine enough to provide for any desired adjustment. The extent of rotation of the guide wheel or roller 33 at each actuation by the pawl will be in accordance with the size of the saw teeth. The saw is moved through the distance of one tooth for each half rotation of the power shaft 29.

At 48 I show a truing device for the points of the teeth. Said device is in the nature of a section of a flat file and acts as a jointer, insuring that the points of the teeth will all be in the same plane. The saw is so adjusted and operated as to be caused to be moved along the lower surface of said jointer 48.

At 49 I show a pair of toothed wheels of substantially the same diameter as the gripping portions of the guide rollers 33 and 34, said toothed wheels being connected to and rotatable with the axes of the guide rollers between the upper jaws 36 and the jointer 48. These wheels 49 act directly upon the teeth *s* of the saw for two principal reasons, namely, first, to provide a positive feeding of the saw in connection with the frictional guiding and feeding actions of the main portions of the guide rollers, and secondly, the teeth of the wheels 49 act upon the several teeth in succession to set them. The wheels 49 may be readily removed from the axes of the rollers and other wheels of different sizes of teeth may be put in their places in accordance with the number of teeth per inch of the saws to be operated upon.

The mechanism having been thus fully set forth, the operation of the machine may be briefly summarized as follows: The saw S is introduced between the rollers 33 and 34 which, together with the jaws 36, snugly engage the opposite faces of the saw just below the teeth *s*. The teeth, however, are caused to engage the lower surface of the jointer 48 and coöperate with the toothed wheels 49. The winged nut 35 is then set to lock the adjustable yoke member 28' from movement. It will be understood that the adjustment of the screw 43 and the number of teeth of the wheels 49 will have been determined according to the character of the saw teeth. The files 24 likewise will be adjusted in the clamps 23 in accordance with the inclination of the teeth of the saw as, for instance, whether it is a cross cut or a rip saw. The shaft 29 having been set in rotation by any suitable means, the wheel 37 will be rotated, causing a step-by-step action of the pawl 40 and a corresponding rotation of the rollers 33 and 34 and the toothed wheels 49. Simultaneously with this rotation of the shaft the bar 18 will be reciprocated with a movement of the files in alternation as previously set forth. Each file, as is usual in the filing of saws, acts upon the front edge of one tooth, then the rear edge of the next, and then, while the saw is moved forwardly through the distance of one tooth, the next file will be brought into action, as will be obvious. With a simple rotation, therefore, of the power shaft, the saw will be jointed, set and filed in a very short time.

The guideways 11 may be hinged together at 50 to vary the inclination at which the files may be operated. The hinge pivots 51 allow the guideways to swing or be adjusted laterally also along slots 52 at the ends of the frame 10 to vary the angle of operation of the files with respect to the vertical plane transverse to the plane of the saw. The outer ends of the guideways are secured to blocks 53 adjustable not only along said slots 52 but also vertically or around the axis of the hinge 50 along slots 54.

Having thus described my invention, I claim as new and desire to secure by Letters Patent:

1. In a saw sharpening machine, the combination of a frame having a pair of guideways arranged therein at an angle to each other, a pair of blocks movable in said guideways, a sleeve secured to each block and extending therefrom at a right angle, a plunger mounted for reciprocation in each sleeve, means connected to each plunger to carry a file with the axis of the file substantially parallel to the adjacent guideway means to reciprocate both blocks and sleeves along the guideways in alternation, means associated with and to cause each file to be lifted out of the plane in which it is active to avoid interference with the next file, and means to support a saw to be acted upon by said files.

2. In a saw sharpening machine, the combination of a frame having a pair of guideways arranged at an angle to each other, a pair of blocks movable in said guideways, a cam block secured to the frame parallel and adjacent to each guideway, said cam block being grooved, a plunger connected to each block movable in the guideways, file holding means connected to the end of the plunger remote from the guiding portion of the frame, and a member extending laterally from the plunger into the grooved portion of the cam block, substantially as and for the purposes set forth.

3. In a saw sharpening machine, the combination of a frame having a guide portion, a block movable along said guide portion, a cam block adjustably connected adjacent and parallel to said guide portion, said cam block having a pair of parallel guide grooves and inclined grooves connecting adjacent ends of said guide grooves, a sleeve secured to the movable block and extending across the plane of the cam block, a plunger carried by the sleeve and reciprocating therein, a pin extending laterally from the plunger into the cam grooves, file holding means carried by the plunger, and means to reciprocate the guide block, substantially as set forth.

In testimony whereof I have signed my name to this specification in the presence of two subscribing witnesses.

TITUS H. LAURY.

Witnesses:
GEO. L. BEELER,
PHILIP D. ROLLHAUS.

Copies of this patent may be obtained for five cents each, by addressing the "Commissioner of Patents, Washington, D. C."